(12) United States Patent
Salapakkam et al.

(10) Patent No.: US 10,928,809 B2
(45) Date of Patent: Feb. 23, 2021

(54) AS-DESIGNED, AS-MANUFACTURED, AS-TESTED, AS-OPERATED AND AS-SERVICED COUPLED DIGITAL TWIN ECOSYSTEM

(71) Applicant: General Electric Company, Schenectady, NY (US)

(72) Inventors: Pradeep Salapakkam, Mason, OH (US); Eric John Ruggiero, Cincinnati, OH (US); James Tallman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/209,940

(22) Filed: Dec. 4, 2018

(65) Prior Publication Data

US 2020/0174457 A1 Jun. 4, 2020

(51) Int. Cl.
| | |
|---|---|
| *G05B 13/02* | (2006.01) |
| *G05B 19/418* | (2006.01) |
| *G06F 30/15* | (2020.01) |
| *G06F 30/20* | (2020.01) |
| *G06F 30/27* | (2020.01) |
| *B64F 5/10* | (2017.01) |
| *G06F 111/10* | (2020.01) |

(52) U.S. Cl.
CPC ... *G05B 19/41865* (2013.01); *G05B 13/0265* (2013.01); *G06F 30/15* (2020.01); *G06F 30/20* (2020.01); *G06F 30/27* (2020.01); *B64F 5/10* (2017.01); *G05B 2219/32015* (2013.01); *G05B 2219/42058* (2013.01); *G06F 2111/10* (2020.01); *Y02P 90/02* (2015.11)

(58) Field of Classification Search
CPC .......... B64F 5/10; G05B 13/0265; G05B 2219/32015; G05B 2219/42058
See application file for complete search history.

(56) References Cited

U.S. PATENT DOCUMENTS

| | | | |
|---|---|---|---|
| 6,067,486 A | 5/2000 | Aragones et al. | |
| 7,457,762 B2 | 11/2008 | Wetzer et al. | |
| 9,146,652 B1* | 9/2015 | Danielsson | G06F 3/048 |
| 2003/0115037 A1* | 6/2003 | Sumida | G06F 30/367 |
| | | | 703/22 |

(Continued)

FOREIGN PATENT DOCUMENTS

WO 2018/183275 A1 10/2018

OTHER PUBLICATIONS

Extended European Search Report from EP Appl. No. 19213189.4, dated May 7, 2020.

(Continued)

*Primary Examiner* — Jennifer L Norton
(74) *Attorney, Agent, or Firm* — Wood IP LLC

(57) ABSTRACT

There are provided methods and systems for optimizing a manufacturing process. For example, there is provided a method for generating a model for driving a decision of a manufacturing process. The method includes simultaneously receiving data from a plurality of sources and executing a machine learning-based procedure on the data. The method further includes updating a physics-based model corresponding to the model in real time based on a result of the machine learning-based procedure.

11 Claims, 4 Drawing Sheets

(56) References Cited

U.S. PATENT DOCUMENTS

| | | | | |
|---|---|---|---|---|
| 2005/0102050 | A1* | 5/2005 | Richey | G05B 19/401 700/97 |
| 2007/0073429 | A1* | 3/2007 | Rees | G06F 30/17 700/97 |
| 2009/0013025 | A1* | 1/2009 | Soejima | G05B 17/02 709/201 |
| 2011/0153295 | A1* | 6/2011 | Yerramalla | G05B 17/02 703/7 |
| 2011/0191091 | A1* | 8/2011 | Joshi | G06F 30/00 703/14 |
| 2011/0295563 | A1* | 12/2011 | McDaniel | G06F 30/20 703/1 |
| 2015/0169821 | A1* | 6/2015 | Peters | G06F 16/14 703/1 |
| 2017/0286572 | A1* | 10/2017 | Hershey | B64F 5/60 |
| 2017/0323240 | A1 | 11/2017 | Johnson et al. | |
| 2017/0323274 | A1 | 11/2017 | Johnson et al. | |
| 2017/0323403 | A1 | 11/2017 | Johnson et al. | |
| 2018/0102000 | A1* | 4/2018 | Vala | G06N 3/08 |
| 2018/0292815 | A1* | 10/2018 | Byers | G05B 13/04 |
| 2019/0196449 | A1* | 6/2019 | Zhang | G06T 19/20 |
| 2020/0042659 | A1* | 2/2020 | Tallman | G06F 30/23 |

OTHER PUBLICATIONS

Benjamin Schleich et al., "Shaping the Digital Twin for Design and Production Engineering," CIRP Annals, Elsevier BV, NL, CH, FR, vol. 66, No. 1, Apr. 21, 2017, pp. 141-144.

Dennis J. Siedlak et al., "A Digital Thread Approach to Support Manufacturing-Influenced Conceptual Aircraft Design," Research in Engineering Design, Springer Verlag, London, GB, vol. 29, No. 2, Sep. 13, 2017, pp. 285-308.

* cited by examiner

100

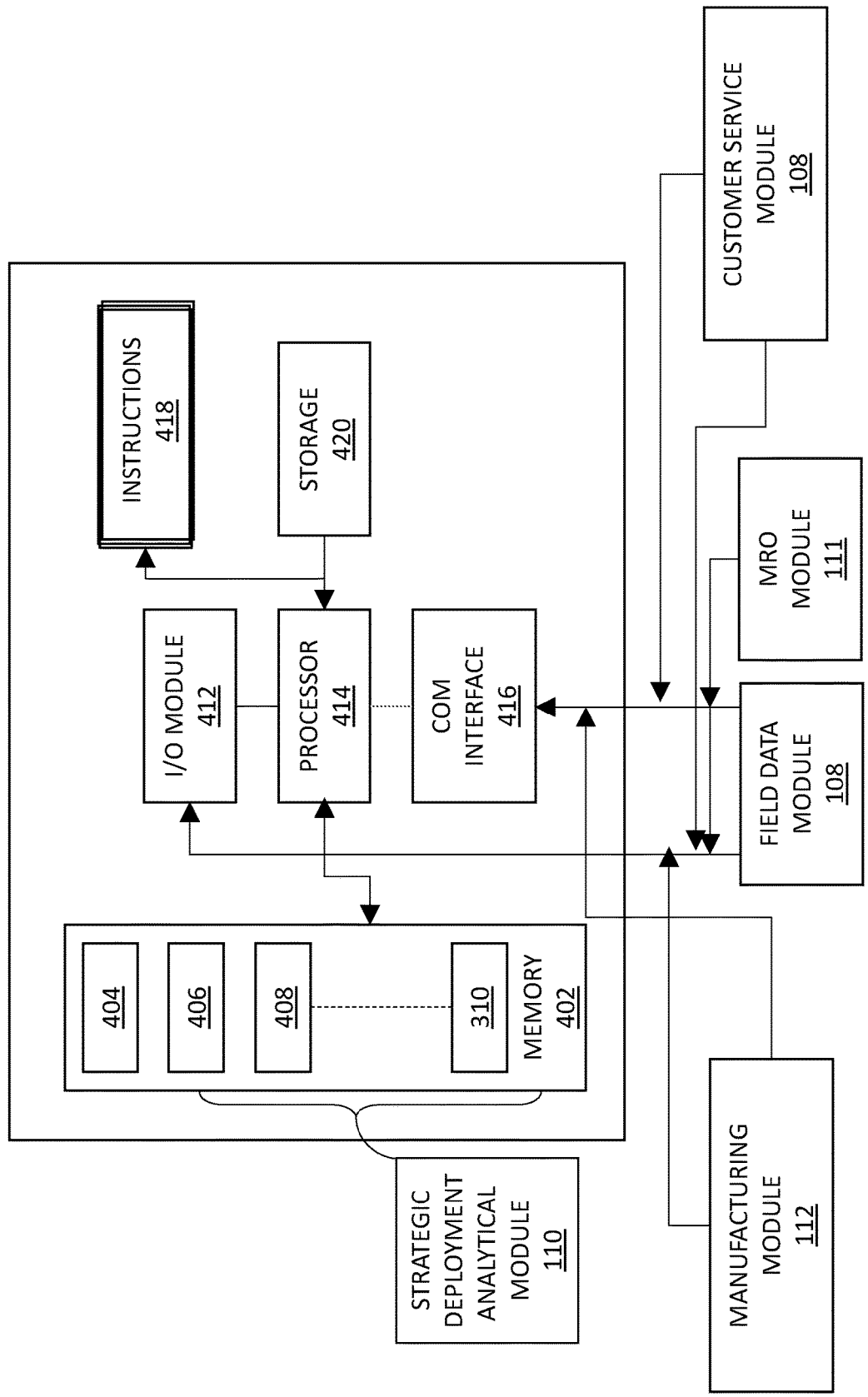

AS-DESIGNED, AS-MANUFACTURED, AS-TESTED, AS-OPERATED AND AS-SERVICED COUPLED DIGITAL TWIN ECOSYSTEM

BACKGROUND

In typical industrial manufacturing processes, parts are produced according to predetermined dimensional tolerances. However, the as-manufactured parts that are deployed in the field may differ from their design intent due to variations in manufacturing processes. For example, and not by limitation, in typical manufacturing processes, there may be a performance variation on how an airfoil will perform on an engine, based on how it was manufactured, and how long that airfoil will perform on the engine under specific operating conditions.

This discrepancy between an as-manufactured component and its performance in the field is particularly important in aircraft engine design and maintenance. As an example, as aircraft engine core components are forced to run at higher temperatures with less cooling flows available, the distribution of component robustness associated with manufacturing variations will be exacerbated. As such, specific performance conditions that may be monitored via field inspections of parts must be considered when manufacturing future parts. Typical manufacturing processes do not integrate this feature. Therefore, there is a need for an automated and integrated manufacturing process as well as a technological infrastructure for monitoring the variations between manufactured parts.

SUMMARY

The embodiments featured herein help solve or mitigate the above-noted issues as well as other issues known in the art. For example, the embodiments provide the ability to link as-built, as-manufactured/assembled, as-designed and as-simulated, as-tested, as-operated and as-serviced components directly through a unique digital integrated process. In the embodiments featured herein, any hardware component has the capability to reference to its design intent and derive multiple analysis outcomes based on its hardware specifications and operational data. The novel process also provides abstraction of data types from multiple analyses to form an integrated digital twin of hardware components. Furthermore, the novel process provides a framework to increase fidelity and accuracy of a system level digital twin by aggregating sub-system component level digital twin predictions. Two non-limiting exemplary embodiments are summarized below.

One exemplary embodiment provides a method for generating a model for driving decisions in a manufacturing process. The method includes simultaneously receiving data from a plurality of sources and executing a machine learning-based procedure on the data. The method further includes updating a model corresponding to the model in real time based on a result of the machine learning-based procedure.

Another exemplary embodiment provides a system configured to generate a model for driving a decision of a manufacturing process for a part. The system includes a processor and a memory including instructions that, when executed by the processor, cause the processor to perform certain operations. The operations may include simultaneously receiving data from a plurality of sources and executing a machine learning-based procedure on the data. Furthermore, the operations may include updating a model corresponding to the model in real time based on a result of the machine learning-based procedure.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 4 illustrates a model according to an embodiment.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The embodiments featured herein have several advantages. For example, they can allow one to make accurate assessments on the quality of new make parts relative to their design intent. They provide the ability to mix and match different manufactured components in an engine assembly to achieve a desired integrated engine performance. Furthermore, they improve time-on-wing assessments of every part and sub-assembly based on manufacturing variations, operational conditions, and as-serviced conditions. The embodiments help leverage the sub-system assembly performance using high fidelity design knowledge, and they improve prediction accuracy as required. Furthermore, they enable feedback loops that help improve subsequent designs.

Figure 1:
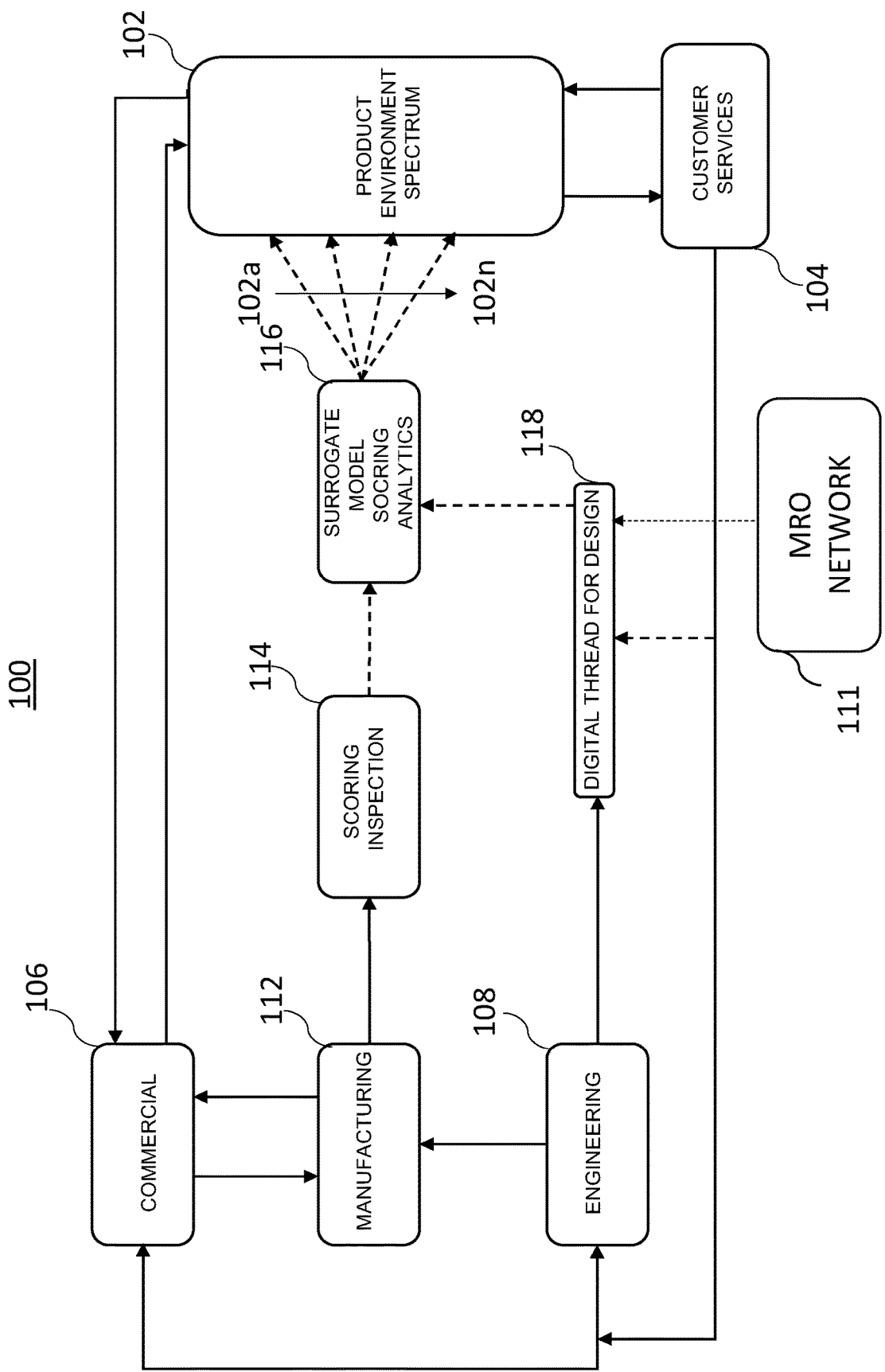
FIG. 1 illustrates a process according to an embodiment.

FIG. 1 illustrates an exemplary process 100 in accordance with an exemplary embodiment. The process 100 may be an example process associated with the lifecycle of a part and/or a general manufacturing cycle. While the process 100 is described in the context of air plane or jet engine parts, it may extend to the manufacture or in general to the lifecycle of any manufactured component. The process 100 includes a module 102 that is a product environment spectrum. In other words, the module 102 can be a database that stores information about instances of the same product as they are used in the field.

For example, the module 102 may include information about the reliability or failure of a plurality of turbine blades as they are commissioned in a fleet of engines (i.e., in two or more engines). The module 102 may be configured to organize, or present upon request from a device communicatively coupled thereto, a product environment spectrum which sorts all of the products of interest in a predetermined order.

For example, the products may be sorted based on their robustness. In one use case, the products may be sorted from more robust (102a) to least robust (102n). Generally, one or more performance criteria may be used to sort these products according to the aforementioned spectrum. In the case of a turbine blade, the products may be sorted according to their thermal robustness performance, which may be measured using one or more field inspection methods.

The product environment spectrum may be driven by constraints from customers, which may be collected and functionalized (i.e., put in the form of computer instructions) in the module 104. In other words, the robustness criteria may be dictated by application-specific parameters derived from customers. Similarly, the product environment spectrum may be driven by commercial constraints, which may be functionalized in the module 106. These constraints (for both the modules 104 and 106) may be updated as the manufacturing process is updated in view of the various sources of information, as shall be further described below.

The customer constraints of the module 104 may also drive the engineering functions of the module 108, which in turn drive the manufacturing decisions, as functionalized in the module 112. Once the engineering decisions are functionalized, they may be used to establish a digital thread that is configured for design (module 118). The digital design thread may also be updated from the constraints of the customers (module 104). This thread thus form a digital twin which can be formed from multiple data sources representing multiple use case. In other words, the digital twin integrates multiple use cases to ensure that manufactured parts are produced according to specific performance data rather than merely producing parts according to predetermined dimensional constraints, as is done in typical manufacturing processes. Therefore, the digital twin allows for engineering re-design based on fielded part performance. As such, the digital twin allows the optimization of a given manufacturing process in order to differentiate quality of as-manufactured parts to drive targeted performance and business outcomes.

Generally, the digital design twin may be constructed from a plurality of sources that include new make manufacturing data from the engineering module, a network 111, and an already existing engineering model of the part (module 108). Data streams from the network 111, may include, for example and not by limitation, borescope inspection data from field inspections (either partial or full, or in some implementations, functional or dimensional inspections), on-wing probes that measure data from an engine during flight. Furthermore, generally, the digital twin of a component may include at least one of as-manufactured data, as-tested data, as-designed and as-simulated, as-operated data, and as-serviced data of the component. Furthermore, the digital twin of the component may be based on operational data or nominal operating conditions of the component.

The process 100 allows data to be collected continuously and to update the model of the module 116 in real-time. Specifically, the digital design thread is continuously updated to provide a model reflecting actual conditions. This is done with the explicit feedback loops of the process 100, which ensure that new designs can be manufactured based the wide variety of sources of information mentioned above. As such, the process 100 provides the ability to better predict the durability of a part, as any manufactured part would have been manufactured based on conditions reflecting design, usage, servicing, etc.

In sum, the process 100 integrates and automates the various aspect of the lifecycle of the part to provide an optimized manufacturing process at an enterprise level. The process 100 further includes a score inspection module 114, which may be updated with field inspection analytics, in order to further augment the model of the module 116.

Figure 2:
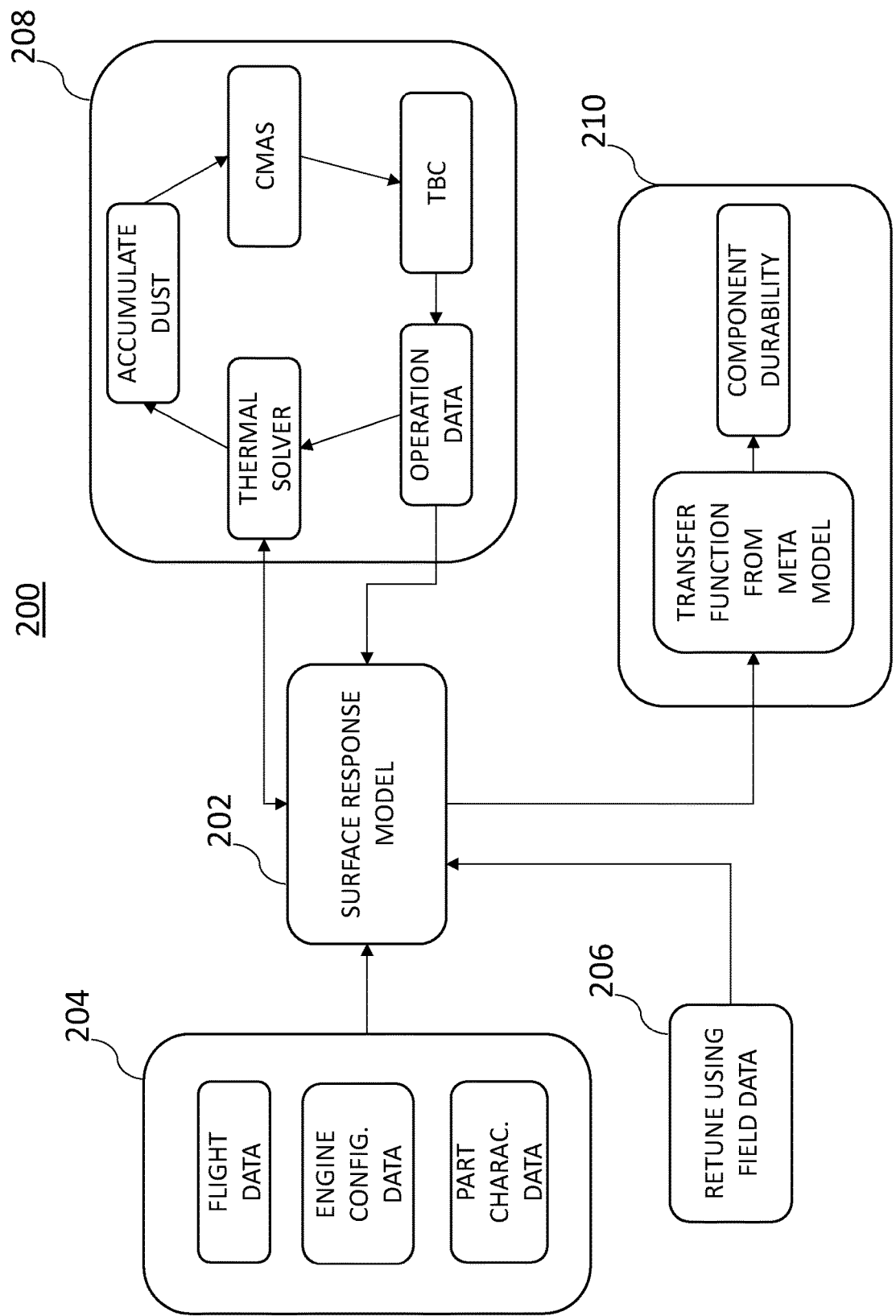
FIG. 2 illustrates a method according to an embodiment.

FIG. 2 illustrates an exemplary method 200 of the process 100 as it applies to aviation services. A manufacturing system configured according to the process 100 may include a model 202, in the case a surface response meta-model, also known as a surrogate model; this model is continuously updated in order to drive manufacturing functions of a new part. The surrogate model includes applying machine learning techniques to create a model that reproduces a response surface from data that originates from a wide variety of sources.

For example, the model 202 may be updated from data originating from a data lake module 204. The data lake (module 204) may be a database that stores structured or unstructured data relative to a wide variety of parts, flight data, and engine configuration data, for example. Furthermore, the model 202 may also be retuned using field data from a module 206 that stores field data obtained from servicing parts. The data sources for these could be remotely located, e.g. they may be from a cloud-based infrastructure, or generally the data may be wirelessly transmitted to the modules 204 and 206.

The module 204 may also be updated continuously from a multi-physics model 208 of the part based on several parameters. For example, the multi-physics model 208 may output a thermal performance of the part (e.g. turbine blades), with which the model 202 may be updated, based on a plurality of parameters. These parameters may be, for example and without limitation, operational data, and the degree of dust accumulated internally and/or externally. The model 202 may then be used to driving manufacturing functions to a make a new set of turbine blades capable of meeting the durability requirements (module 210) derived from the wide variety of input sources to the model 202.

Generally, in FIG. 2, the multi-physics simulation models 208 are leveraged from what was created during the design phase 108, and fed directly into the Digital Thread for Design (i.e., the module 118). A such the process of training the surrogate model based on the multi-physics models can be expedited. Furthermore, the model 208 is an embodiment of a multi-physics model, and as such, it is representative of any multi-physics model that might be used to create training data to feed the surface meta model 202. Furthermore, the model 208 may, in some embodiments, be made from empirical models.

Figure 3:
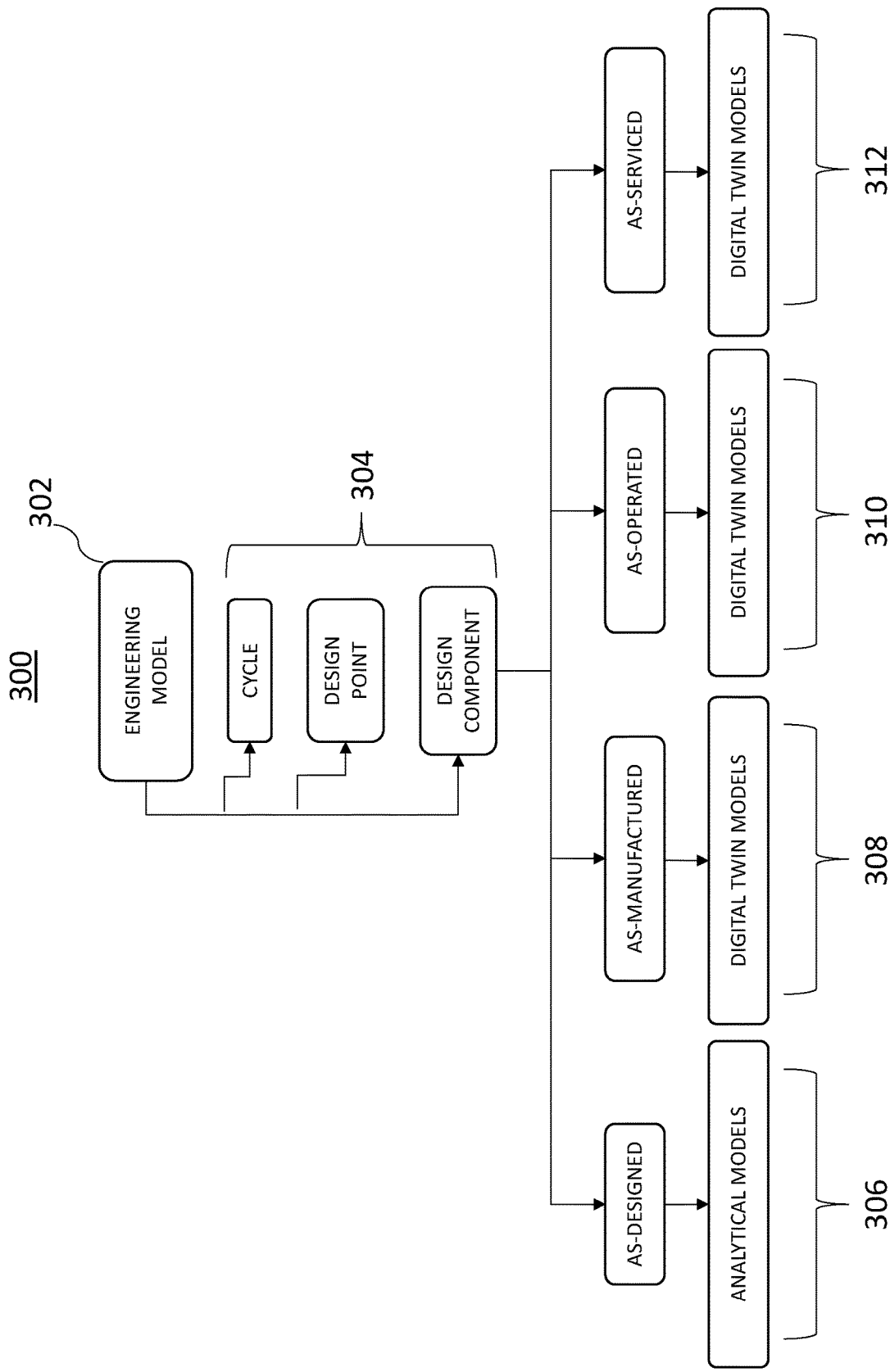
FIG. 3 illustrates a system according to an embodiment.

FIG. 3 illustrates a general architecture 300 of the novel as-manufactured, as-tested, as-operated, as-designed and as-simulated, and as-serviced coupled digital twin ecosystem. The architecture 300 is a layered model 302 that includes information from a wide variety of sources. As such, fabricated a part according to the model 302 ensures that the part will satisfy the requirements associated with the data from the many sources of information. For example, the model 302 includes a first layer 304 that includes design information for the specific part that is to made.

The first layer 304 can include cycle information, design point, and component designs for the new part. The first layer 304 is only an implementation example. Depending on the specific engineering discipline and component, this lineage of information can be different. The model 302 can further include a second layer that includes a plurality of components 306, 308, 310, and 312. For example, the component 306 can include design information and analytical models pertaining to previous designs of instances of the part that is to be manufactured.

The component 308 may include digital twin models of an instance of the part that has been previously manufactured. The component 310 may include digital twin models of an instance of the part that has been operated in the field and for which environmental and operational data is available. Furthermore, the component 312 may include digital twin models of an instance of the part that has been serviced.

Generally, the model 302 may be obtained via-a machine learning procedure that considers the information from all aforementioned layers and layer components. The embodiments generally provide the ability to make accurate assessments on quality of new make parts relative to design intent. They provide the ability to mix and match different manufactured components in an engine assembly to achieve desired integrated engine performance.

FIG. 4 depicts a system 400 that is an example implementation of the architecture 300, which represent the novel digital twin ecosystem. The system 400 includes an application-specific processor 414 configured to perform tasks specific to optimizing a manufacturing process according to the 100. The processor 414 has a specific structure imparted by instructions stored in a memory 402 and/or by instructions 318 that can be fetched by the processor 414 from a storage 420. The storage 420 may be co-located with the processor 414, or it may be located elsewhere and be communicatively coupled to the processor 414 via a communication interface 416, for example.

The system 400 can be a stand-alone programmable system, or it can be a programmable module located in a much larger system. For example, the system 400 be part of a distributed system configured to handle the various modules of the process 100 described above. The processor 414 may include one or more hardware and/or software components configured to fetch, decode, execute, store, analyze, distribute, evaluate, and/or categorize information.

The processor 414 can include an input/output module (I/O module 412) that can be configured to ingest data pertaining to single assets or fleets of assets. The processor 414 may include one or more processing devices or cores (not shown). In some embodiments, the processor 414 may be a plurality of processors, each having either one or more cores. The processor 414 can be configured to execute instructions fetched from the memory 402, i.e. from one of memory block 404, memory block 406, memory block 408, and memory block 410.

Furthermore, without loss of generality, the storage 420 and/or the memory 402 may include a volatile or non-volatile, magnetic, semiconductor, tape, optical, removable, non-removable, read-only, random-access, or any type of non-transitory computer-readable computer medium. The storage 420 may be configured to log data processed, recorded, or collected during the operation of the processor 414. The data may be time-stamped, location-stamped, cataloged, indexed, or organized in a variety of ways consistent with data storage practice. The storage 420 and/or the memory 402 may include programs and/or other information that may be used by the processor 414 to perform tasks consistent with those described herein.

For example, the processor 414 may be configured by instructions from the memory block 406, the memory block 408, and the memory block 410, to perform real-time updates of a model for a part based on a variety of input sources (e.g. the network 111 and/or a field data module 108). This group of memory blocks may form a strategic deployment module 110. The processor 414 may execute the aforementioned instructions from memory blocks, 406, 408, and 410, and output a twin digital model that is based on data from the wide variety of sources described above. Stated generally, from the continuous updates, the processor 414 may continuously alter the strategy deployment module 410 that includes the model for the part.

The embodiments provide the capability to improve time on wing assessments of every part and its sub-assembly based on manufacturing variations, operational conditions and as-serviced data. Furthermore, the embodiments help leverage the sub-system assembly performance using high fidelity design knowledge and improve prediction accuracy as required, and they enable feedback loop that help improve subsequent designs.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for making a new part according to an optimized manufacturing process, the method including:
   receiving data from a plurality of sources, the data including as-designed, as-manufactured, as-simulated, and as-tested data relative to one or more parts similar to the new part;
   updating in real-time a surrogate model of the new part, wherein the surrogate model forms a digital twin of the new part, the digital twin including at least two of the as-designed, as-manufactured, as-simulated, and as-tested data-; and
   executing, based on the digital twin, a set of functions to make the new part.

2. The method of claim 1, wherein the plurality of sources include new make manufacturing data and a network.

3. The method of claim 1, wherein the data is associated with a component.

4. The method of claim 3, wherein the data relative to the component is at least one of the as-designed data, the as-manufactured data, the as-tested data, as-operated data, as-serviced data or a combination thereof.

5. A system configured to manufacture a new part according to an optimized manufacturing process, the system comprising:
   a processor;
   a memory including instructions that, when executed by the processor, cause the processor to perform operations including:
   simultaneously receiving data from a plurality of sources, the data including as-designed, as-manufactured, as-simulated, and as-tested data;
   updating in real-time a surrogate model of the new part, wherein the surrogate model forms a digital twin of the new part, the digital twin including at least two of the as-designed, as-manufactured, as-simulated, and as-tested data; and
   executing, based on the digital twin, a set of functions to make the new part.

6. The system of claim 5, wherein the plurality of sources include new make manufacturing data and a network.

7. The system of claim 5, wherein the data is associated with a component.

8. The system of claim 5, wherein the data relative to the component is at least one of the as-designed data, the as-simulated data, the as-manufactured data, the as-tested data, as-operated data, as-serviced data or a combination thereof.

9. The system of claim 5, wherein the data further includes operational data or nominal operating conditions of a component.

10. The system of claim 5, wherein the new part is a component of an engine.

11. The system of claim 5, wherein the digital twin includes a representation of a component of an engine.

* * * * *